United States Patent [19]

Peters et al.

[11] Patent Number: 4,806,389

[45] Date of Patent: Feb. 21, 1989

[54] METHOD OF TREATING A COATED PHOSPHOR

[75] Inventors: Thomas E. Peters, Chelmsford; Roger B. Hunt, Jr., Medfield, both of Mass.

[73] Assignee: GTE Laboratories Incorporated, Waltham, Mass.

[21] Appl. No.: 20,972

[22] Filed: Mar. 2, 1987

[51] Int. Cl.[4] ............................................. B05D 5/12
[52] U.S. Cl. ........................................ 427/67; 427/66; 427/71; 427/73; 427/64; 427/181; 427/214; 427/215; 427/221; 427/226; 427/230
[58] Field of Search ................. 427/67, 71, 66, 73, 427/230, 181, 214, 215, 226, 221, 375, 64; 313/483

[56] References Cited

U.S. PATENT DOCUMENTS

| 2,151,496 | 3/1939 | Beese | 176/122 |
|---|---|---|---|
| 2,908,571 | 9/1959 | Seats | 427/73 |
| 3,833,398 | 9/1974 | Schreurs | 117/33.5 |
| 3,963,639 | 6/1976 | Klein | 252/301 |
| 4,219,587 | 8/1980 | Oba | 427/64 |
| 4,265,950 | 5/1981 | Graff | 428/35 |
| 4,308,297 | 12/1981 | Yamazaki | 427/67 |
| 4,340,512 | 7/1982 | Schreurs | 523/122 |
| 4,396,863 | 8/1983 | Ranby et al. | 313/486 |
| 4,576,833 | 3/1986 | Scholten | 427/67 |
| 4,585,673 | 4/1986 | Sigai | 427/213 |

FOREIGN PATENT DOCUMENTS 1045908 1/1979 United Kingdom ............... 117/21

Primary Examiner—Janyce Bell
Attorney, Agent, or Firm—Ivan L. Ericson

[57] ABSTRACT

A method for preventing the hydration/solubilization of the protective oxide coating of a phosphor is described. The method involves coating of the oxide coated phosphor particles with a continuous hydrophobic coating. After the phosphor particles are coated with the continuous hydrophobic coating and the continuous hydrophobic coating cured, they are added to a water-based suspension and subsequently processed into a lamp.

2 Claims, No Drawings

METHOD OF TREATING A COATED PHOSPHOR

FIELD OF THE INVENTION

This invention relates to a method of treating a phosphor. More particularly, this invention relates to a method of treating a coated phosphor.

BACKGROUND OF THE INVENTION

In the fabrication of fluorescent lamps, a phosphor layer is coated on the interior surface of a glass lamp envelope using a paint-like suspension of phosphor powder. Although the composition of the suspension varies from manufacturer-to-manufacturer, the composition usually includes, in addition to the phosphor, a film forming binder, solvent(s) for the binder, and if necessary surfactants, defoamers and wetting agents. Most non-phosphor components of the coating suspension interfere with efficient lamp operation and longevity, and must be removed by pyrolysis in a manufacturing step known as "lehring". Another inorganic, non-fluorescent, component of the coating suspension is a submicron particle sized material, such as silicic acid or alumina, which helps bind the phosphor to the glass after the "lehr" process has removed the organics. Butler in his book, *Fluorescent Lamp Phosphors, Technology and Theory*, Penn State University Press (1980), gives a rather complete description of lamp coating technology and its evolution from the nitrocellulose and ethylcellulose-type lacquers to the newer polymeric binders that employ water as the solvent in place of the environmentally objectionable and flammable organic compounds. Depending on the chemical composition of the phosphor and method of preparation, phosphors may exhibit some differences in performance depending on whether they are deposited from organic-based suspension or from water-based suspension systems. Usually these differences are not significant unless the phosphor has a tendency to react chemically with one of the suspension components.

A variety of technologies have been described recently, e.g., U.S. Pat. No. 4,585,673, that permit the coating of phosphor particles with a thin film of a refractory oxide. This film can be made from a choice of different refractory oxides. Some of these, particularly $Al_2O_3$ and $Y_2O_3$, have been found effective in protecting the phosphor against processes that cause lumen depreciation in fluorescent lamps. One example of such a protective coating, is that described in U.S. Pat. No. 4,585,673, in which the phosphor particles were coated with $Al_2O_3$ by pyrolizing an aluminum alkyl in a fluidized bed of phosphor powder. Experimental fluorescent lamps employing such coated phosphors, particularly those using $Zn_2SiO_4:Mn$ (Willemite) have shown significant improvements in lumen maintenance relative to lamps employing uncoated phosphors. Lamp test data also indicate that $Al_2O_3$ coated $Zn_2SiO_4:Mn$ phosphors (ACPs) perform equally well with regard to luminance and lumen maintenance when applied to the lamp envelope from freshly prepared organic or water-based suspensions. If, however, the ACP is applied from a water-based suspension that has been held-over for several days before use, the beneficial effects associated with the oxide coating are lost. This presents an obstacle to the commercialization of lamps based on the coated phosphor technology. Government regulations have already eliminated the use of organic-based phosphor suspensions in many parts of the world, and reintroduction and/or expansion of this old technology is therefore not a viable option. Moreover, the use of only freshly prepared water-based phosphor suspensions is precluded by the short useful life of these suspensions and by the cost of dumping the large volumes of aged material that would be generated in a modern automated lamp manufacturing facility. Therefore, it is desirous to provide a method which will improve the useful life of water-based phosphor suspensions which presently ave poor hold-over characteristics.

SUMMARY OF THE INVENTION

In accordance with one aspect of the present invention, a new and improved phosphor process comprises the following steps:

Step 1 - Phosphor particles having a protective coating are coated with a continuous hydrophobic coating.

Step 2 - The product from step 1 was heated at a temperature and for a period sufficient to cure said continuous hydrophobic coating.

Step 3 - The product from step 2 is added to a water-based suspension.

Step 4 - The produce from step 3 is coated on the inside surface of a lamp.

Step 5 - The produce of step 4 is "lehred" at a temperature sufficient to remove said hydrophobic continuous coating from said phosphor particles having a protective coating; and Step 6 - The produce from step 5 is processed into a lamp.

DETAILED DESCRIPTION OF THE INVENTION

We have investigated the degradation of $Al_2O_3$ coated $Zn_2SiO_4:Mn$ phosphors (ACPs), a coated willemite, in water as a function of the hold-over time, the time the water-based suspension is stored before it is used to coat a lamp such as a fluorescent lamp, a HID lamp etc. We also investigated a water-based suspension that uses polyethylene-oxide (Polyox - a product of Union Carbide Corp.) as the binder. In evaluating the hold-over problem with coated willemite, manganese activated zinc silicate phosphor, we have noticed that the Polyox coating solution is noticeably thicker (more viscous) after being held-over, than when it is fresh. When the held over coated phosphor suspension is coated on a glass slide (a thick coating) and is dried, the coating develops cracks. This cracking of the phosphor layer occurs only when the alumina coating is no longer providing protection for the phosphor. In other words, a suspension of a fresh alumina coated phosphor, or an uncoated phosphor, doesn't exhibit cracking. However, a held-over suspension of an alumina coated phosphor does produce cracked coatings. While not wishing to be bound by theory, it is believed that the alumina coating comes off the phosphor and becomes a component of the suspension media and thereby causes a cracked phosphor layer.

Typically, during the investigation, suspensions of ACP were prepared and kept continuously agitated for periods of up to two months, with aliquots removed periodically for lamp tests. In the preliminary tests, the suspensions of ACP were coated on glass slides and evaluated in a demountable fluorescent lamp of approximate T-12 bore, operated at approximately 400 mA, and at an argon pressure from about 2-3 Torr. We have demonstrated that the light emitted by a coated phosphor deposited from the freshly prepared coating suspension remains almost constant for the duration of the test while that from the phosphor deposited from an aged suspension begins to drop from the instant the lamp was turned on. It was this almost catastrophic drop in lumen maintenance that made the demountable lamp an ideal vehicle in which to test ACP hold-over while minimizing both the time and quantity of material required for each evaluation.

These tests revealed that water is the principal agent in the destruction of the $Al_2O_3$ coating and loss of the high lumen maintenance it affords. To protect the $Al_2O_3$ coating, we applied a hydrophobic coating to the ACP from a solution containing a Latex such as B. F. Goodrich Hycar Acrylic Latex #26138. Such Latexes are colloidal dispersions of acrylic polymers in water. The polymer can be deposited on a substrate such as the surface of a phosphor particle, by destabilizing the colloid. Factors that promote destabilization include; small concentrations of polyvalent cations, significant and rapid changes in pH or temperature, and the addition of certain water-soluble solvents such as ketones, alcohols and esters. With our ACPs, colloid destabilization occurs on contact because the phosphor surface is a source of $Al^{3+}$ ions. After the acrylic coating has been deposited, it must be cured by heating to a temperature 300° F. for about 30 minutes. Curing is a process by which reactive side groups on polymer chains are linked together. A detailed description of the application of a water-proof Acrylic polymer coating is given in Example #1.

EXAMPLE #1

The dispersant employed in the application of the water-proof coating was an aqueous solution containing 2.5 wt% of Union Carbide N3000 Polyox Resin. Although the use of the Polyox dispersant may not be essential, it was used because hydration/solvation of the oxide coating was found to proceed at a reduced rate in this material.

In the Acrylic coating process, 40 gms of ACP was dispersed in 120 ml of dispersant. To this was added a 40 ml aliquot of dispersant containing Goodrich Hycar Acrylic Latex #26138. The concentration of Latex was sufficient to provide a polymer coating amounting to 0.05 wt% of the phosphor. The Latex was destabilized upon contact with the phosphor as evidenced by the disappearance of the cloudiness associated with the colloidal dispersion. The polymer coated ACP was extracted from the dispersant by washing several times on a buchner funnel with distilled water, and then drying at 100° C. The dried powder was then further subjected to a heat treatment at 300°-340° F. for about 40 minutes in order to cross-link and detackify the polymer coating, that is to say to eliminate the sticky nature of the coating.

Polymer coated ACPs prepared in this way were incorporated in suspensions based on aqueous Polyox or water alone and evaluated in a demountable fluorescent lamp as described earlier. When pure water was used as the suspension medium, the polymer coated ACP showed no loss of efficiency after 5 days hold-over, while ACPs without the polymer coating degraded severly after only 3 days.

Fluorescent lamps which can be used in the instant invention can have the structure as shown, for example, in U.S. Pat. Nos. 3,424,605; 3,424,606; 3,435,271; or 4,594,178; the FIGS. of which, and the portions of the specification corresponding thereto, are incorporated herein by reference to the extent necessary to complete this specification. Such fluorescent lamps hermetically sealed tubular glass envelope coated on its inside surface with the powdered phosphor coating in accordance with the present invention, which converts the ultra-violet energy of a mercury arc discharge established through the center of the tube into visible light as it is absorbed by the phosphor layer during operation of the lamp. The bases at each end of the tubular envelope support electrical leads which are electrically connected to electrodes at each end of the lamp. The spaced electrodes can be coated with electron-emission promoting materials, such as mixtures of oxides containing a barium oxide, to facilitate operation of the lamp. During operation, a mercury droplet maintained within the sealed envelope is vaporized thereby causing the characteristic mercury discharge. Except for the nature of the phosphor coating, which is the subject of the present invention, construction of the fluorescent lamp is conventional.

We have identified and evaluated a method of preserving the oxide coating on phosphors during hold-over in water-based suspensions. The hydrophobic protective coating prevents the hydration/solubilization of the protective coating oxide and extends, indefinitely, the useful life of the water-based suspensions of the coated phosphors.

While there has been shown and described what is at present considered the preferred embodiment of the invention, it will be obvious to those skilled in the art that various changes and modifications may be made therein without departing from the scope of the invention as defined by the appended claims.

What is claimed is:

1. A phosphor process comprising the following steps:
   Step 1 - coating phosphor particles having a continuous alumina coating with a continuous hydrophobic coating, said continuous hydrophobic coating consisting essentially of an acrylic polymer;
   Step 2 - heating the product from step 1 at a temperature and for a period sufficient to cure said continuous hydrophobic coating;
   Step 3 - adding the product from step 2 to a water based suspension, said water based suspension comprising water and a polyethylene-oxide as a binder;
   Step 4 - coating an inside surface of a lamp with the product of step 3;
   Step 5 - lehring the product from step 4 at a temperature sufficient to remove said hydrophobic coating from said phosphor particles having a continuous alumina coating; and
   Step 6 - processing the product from step 5 into a lamp.

2. A phosphor process in accordance with claim 1 wherein said phosphor particles comprise particles of manganese activated zinc silicate phosphor.

* * * * *